United States Patent
Levin

(10) Patent No.: US 10,605,696 B2
(45) Date of Patent: Mar. 31, 2020

(54) OPTICAL TIME-DOMAIN REFLECTOMETER (OTDR) WITH INTEGRATED, RETRACTABLE LAUNCH CABLE

(71) Applicant: Lifodas, UAB, Vilnius (LT)

(72) Inventor: Piotr Anatolij Levin, Vilnius (LT)

(73) Assignee: LiFodas, Vilnius (LT)

( * ) Notice: Subject to any disclaimer, the term of this patent is extended or adjusted under 35 U.S.C. 154(b) by 168 days.

(21) Appl. No.: 15/575,715

(22) PCT Filed: May 26, 2015

(86) PCT No.: PCT/IB2015/053907
§ 371 (c)(1),
(2) Date: Nov. 20, 2017

(87) PCT Pub. No.: WO2016/189352
PCT Pub. Date: Dec. 1, 2016

(65) Prior Publication Data
US 2018/0292293 A1 Oct. 11, 2018

(51) Int. Cl.
*G01M 11/00* (2006.01)
*G02B 6/44* (2006.01)

(52) U.S. Cl.
CPC .... *G01M 11/3154* (2013.01); *G01M 11/3145* (2013.01); *G02B 6/4457* (2013.01)

(58) Field of Classification Search
CPC .......... G01M 11/3154; G01M 11/3145; G02B 6/4457
See application file for complete search history.

(56) References Cited

U.S. PATENT DOCUMENTS 6,594,004 B1 * 7/2003 Makita ............... G01M 11/3145
356/73.1
2005/0258242 A1 * 11/2005 Zarembo .................. A61N 1/08
235/385

(Continued)

*Primary Examiner* — Hina F Ayub
(74) *Attorney, Agent, or Firm* — Chisholm, Persson & Ball, P.C.; Michael J. Persson; Catherine E. Napjus

(57) ABSTRACT

The present invention is an Optical Time-Domain Reflectometer (OTDR) with an integrated Launch Cable that has a retractable lead, designed to work as a standalone instrument, or under the control of an external device such as a smartphone, tablet, PC, or server.

The first characterized feature of this invention is the integration of the OTDR and Launch Cable in one housing where the spool of the aforementioned Launch Cable can rotate and is spring-loaded relative to the aforementioned housing, and is equipped with a flying lead that can be extracted from or retracted back into the aforementioned housing under spring tension, or where the spool of the aforementioned Launch Cable is affixed to the aforementioned housing and equipped with a flying lead that can be manually unwrapped from and wrapped back into the aforementioned housing; the OTDR and Launch Cable are attached, for example using standard fiber optic connectors, so that the Launch Cable can be easily replaced in the field by a user with no special tools.

The second characterized feature of this invention is to integrate a wireless transmitting and receiving device into the OTDR module, which can receive setup and other commands from, and send instrument status and test results to an external device.

The advantages of such a device are: the ability to conveniently hold, place, or hang the instrument as a single unit while in use; the ability to place the instrument into its carry case without disconnecting the launch cable, thus reducing the number of connection, cleaning, and inspection steps that must be performed each time the instrument is removed (Continued)

from its carry case for use and reducing wear on the OTDR test port and launch cable (OTDR end) connectors; the ability to remove and replace Launch Cable module in the field without special tools should it become damaged or if the user wants a different connector type; the ability to use an external device to analyse and format test results and provide additional networking functions; the ability to move processing functions to the external device, which in turn allows the use of lower power, lower cost processors in the OTDR to reduce cost and increase battery life. The present invention also includes a special embodiment in which the OTDR module is physically located within the Launch Cable module so that the overall device becomes more compact, and more resistant to drops and other external impacts.

19 Claims, 4 Drawing Sheets

(56) References Cited

U.S. PATENT DOCUMENTS

| | | | |
|---|---|---|---|
| 2008/0086278 A1* | 4/2008 | Nakayama | G01M 11/3136 |
| | | | 702/84 |
| 2012/0033142 A1* | 2/2012 | Thomson | G02B 7/002 |
| | | | 348/838 |
| 2015/0062564 A1* | 3/2015 | Kowalczyk | G01M 11/088 |
| | | | 356/73.1 |
| 2017/0013343 A1* | 1/2017 | Tomlinson | B65H 75/4431 |

* cited by examiner

OPTICAL TIME-DOMAIN REFLECTOMETER (OTDR) WITH INTEGRATED, RETRACTABLE LAUNCH CABLE

FIELD OF THE INVENTION

The present invention relates to the Optical Time Domain Reflectometer (OTDR), a test instrument designed to certify and fault locate fiber optic links.

BACKGROUND OF THE INVENTION (TECHNICAL LEVEL)

To test a given fiber optic link, an OTDR is connected to one end of this link and then set up to inject a series of light pulses into the link while sampling (measuring) returned light power as a function of time. Returned light is composed of (Rayleigh) backscatter from the optical fiber sections comprising the link and (Fresnel) reflections from connections, splitters, breaks, or other events within the link. By converting sample times into distances based the estimated speed of light in optical fiber, the OTDR can create a graphic representation of link insertion loss as a function of distance and the reflectance of link events.

OTDR performance is generally specified in terms of measurement accuracy, measurement range, ability to resolve and measure closely-spaced events, measurement speed, and ability to perform satisfactorily tinder various environmental extremes and after various types of physical abuse. In addition, OTDR value is impacted by its price and user experience factors such as size, weight, and ease of use.

Measurement accuracy is defined as the uncertainty of a measurement, or the difference between a measured value and the true value of the parameter being measured. OTDR measurement range is defined as the maximum link insertion loss at which a specified parameter of a specified event type can be measured with a specified accuracy. Resolution is a measure of how close two events can be spaced and still be accurately measured, or at least recognized, as separate events. OTDR resolution is a function injected light pulse duration and returned light measurement bandwidth. In general, shorter injected light pulse duration and higher returned light measurement bandwidth will result in better (i.e. shorter) OTDR resolution. Resolution is also impacted by event loss and reflectance. In general, the larger the loss or reflectance of the first event in an event pair, the longer the distance between the events must be to ensure that the second event can be measured with a specified accuracy.

An event pair directly related to the present invention are the two connections created when an OTDR is connected to the link under test at a patch panel using a fiber optic test cord. The first connection in this pair occurs at the OTDR test port. The second occurs at the first connector of the link under test. If the OTDR test port connection had zero loss and zero reflectance, then any OTDR could accurately measure the first link connection regardless of test cord length. However, the best quality, lowest-reflectance fiber optic connectors available today have some loss and reflectance. As a result, even OTDRs with state of the art resolution performance require a test cord length of about 50 meters or more to ensure accurate measurement of the first link connection.

Because such long jumpers would be hard to use and expensive, OTDR manufacturers and other vendors offer special test cord assemblies called Launch Cables, which comprise a coil of optical fiber, enclosed in a protective housing, with connectorized flying leads—in effect one half of a fiber optic jumper—at each end, and a total connection-free fiber length sufficient to ensure accurate measurement of the first link connection.

One such assembly is described in U.S. Pat. No. 6,915,058 document that is published at Jul. 5, 2005. In this document is described a retractable Optical Fiber assembly which includes a housing, a spring-loaded, rotatable spool, and a length of optical fiber reeled onto the spool. The optical fiber comprises a central length of thin (unjacketed) fiber terminated by 1 or 2 m of jacketed fiber at each end. This product is designed so that the jacketed fiber end sections, essentially two fiber optic jumpers fusion spliced to the central fiber section, are reeled on to and off of the spool in the same direction. The total length of optical fiber is greater than the minimum optical fiber length needed to ensure accurate measurement of the first link connection.

One problem of this solution is that it requires the OTDR user to carry a separate box with their OTDR. In addition, each time the OTDR is unpacked for use, this launch cable embodiment must be connected to the OTDR test port thus exposing the OTDR test port and a launch cable connector to unnecessary wear and possible damage if the two connectors are not cleaned properly before they are connected.

To address the two problems described above, the OTDR can be equipped with an internal launch cable. For example, in the embodiment described in U.S. patent US20050259242, published on Mar. 21, 2006, the OTDR end of a "smart" fiber test module (SFTM) is fusion-spliced to the OTDR while other end is equipped with a flying lead, basically a fiber jumper, so that the SFTM can be connected to a patch panel. The OTDR and SFTM share a common housing and thus may be considered a single instrument or unit.

However this solution presents a new and significant problem. Because the SFTM is fusion spliced to the OTDR there is no easy way for users to replace this module in the event that its flying lead (jumper), or the connector on this lead, becomes damaged through misuse, or simply worn out over time from normal use.

A similar solution can be found in OTDRs with built-in launch cables, or more correctly launch fibers, such as the Anritsu MT9090A OTDR: http://www.anritsu.com/en-US/-products-Solutions/Products/MT9090A.aspx. However, this embodiment suffers the same problem as the one noted above. Because it is fusion-spliced to the OTDR it cannot be replaced easily. In addition, because no flying lead is provided, this solution can only be used to test links with end cables that are not terminated in a patch panel.

In contrast, the present invention as described in the next sections, solves the problems described above related to separate launch cable assemblies without adding problems associated launch cables that are fusion spliced to the OTDR, or that have no flying lead. In addition the present invention offers several new advantages.

SUMMARY OF THE INVENTION

The present invention is an Optical Time-Domain Reflectometer (OTDR) with an integrated but connectorized and therefore detachable Launch Cable Implementing this device requires a new combination of and improvements to several existing technologies Two key features of this invention are first, the OTDR and Launch Cable (with flying lead) are contained by a single housing and second, the OTDR and Launch Cable are connected (rather than fusion spliced) to each other making it possible for users to easily detach and replace the Launch Cable in the field, should it become damaged or worn out. A third key feature is the integration of wireless remote control technology so that the test instrument can be operated by an external device such as a smartphone, tablet, or PC.

The advantages offered by the present invention include:
Less weight than a typical OTDR plus external launch cable
Easier and faster to set up since the OTDR and launch cable can remain connected even when the instrument is packed for storage or transport.
More convenient to hold or mount on an equipment bay at the job site since there is only a single unit for the user to manage while the OTDR is being used.
Less mechanical wear of the OTDR test port and OTDR-side launch cable connectors.
Less chance of accidentally damaging the OTDR test port or OTDR-side launch cable connector.
Ability for users to easily replace the launch cable in the field if it becomes worn out through normal use, it is accidently damaged, or they need a different (network side) connector type.
Ability to use a smart device already owned by the user to implement the user interface (UI) and connect to the internet, including highly portable smart phones, and tablets, laptops, or desktop PCs with large screens.
Simpler, less costly processors in the OTDR since most calculations can be made by the external device.
Ability for remote users or servers to control and collect data from the OTDR via internet connections.
The present invention also includes special embodiments in which the OTDR is physically contained within the launch cable and flying lead assembly, making the instrument more compact and resistant to impact damage.

DETAILED DESCRIPTION

Figure 1:
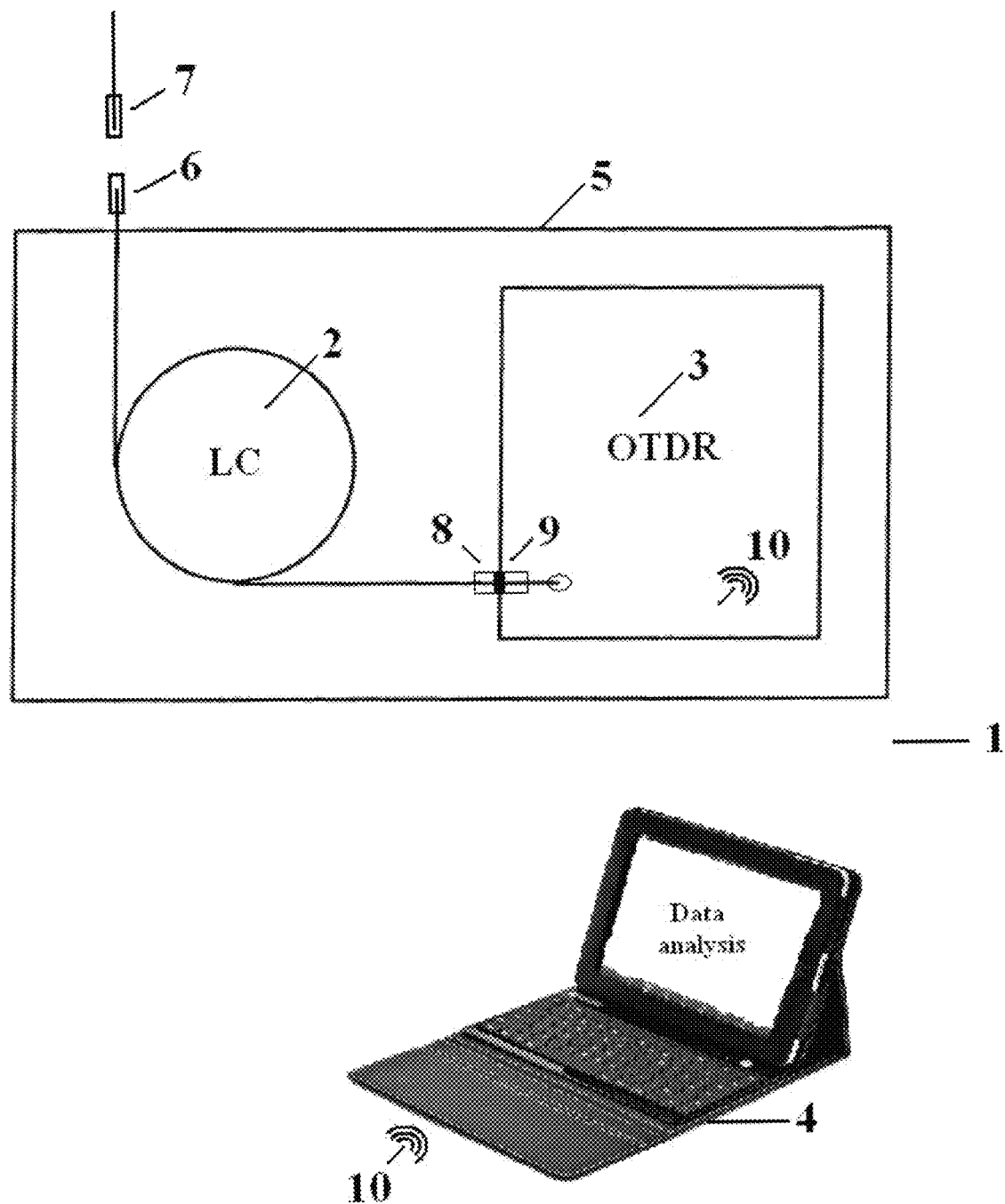
FIG. 1 shows the structural scheme of the present invention, comprising a Launch Cable, OTDR, and external device.

In FIG. 1, an Optical Time-Domain Reflectometer (OTDR) with an integrated but detachable Launch Cable, designed to work as standalone instrument or as a Remote Unit (RU) with external devices, is shown (1), which is an object of the present invention and will be referred to simply as Device (1) of this invention. In one of its OTDR modes, device (1) can be used to certify or fault locate FTTx PON or point-to-point fiber optic links that may include features or events such as fiber optic connections, fusion splices, mechanical splices, and optical splitters, in addition to faults such as optical fiber cable breaks and macrobends. Device (1) OTDR measurements may include end-to-end link loss and ORL, as well as the location, loss, and reflectance of individual events (including the first link connection). Without removing the launch cable, Device (1) may also be used in light source mode to measure end-to-end link loss at multiple wavelengths, or in visual fault locate (VFL) mode to find faults caused by bad connections or fiber bends using a visible (red) laser.

Device (1) comprises two main modules: Launch Cable (2) and OTDR (3).

It is important to note that both the Launch Cable (2) and OTDR (3) modules are integrated in a single housing (5).

In general, the Launch Cable (2) is an optical fiber of some length, which is used to perform measurements of an optical connector (7) of the optical fiber link under test. First end (6) of the Launch Cable (2) is a flying lead (a jumper) which can be extracted or unwrapped from the housing (5) in order to be connected to the first optical connector in the link under test (7). The length of the flying lead (6), which can be extracted or unwrapped from and retracted or rewrapped back into the housing (5), is about 2 m, which is typically long enough to safely and conveniently hold Device (1), or put Device (1) onto a table, the floor, or hang Device (1) from the wall or an equipment rack during use. The length of internal section of the Launch Cable (2), which is located inside of the housing (5), is usually about 50 meters (m). Second end (8) of Launch Cable (2) is connected to OTDR's test port connector (9). The function of Launch Cable (2) is to connect the OTDR with the optical fiber link with a total fiber length sufficient to measure the loss of the first link connection accurately.

Two key features of the present invention are first, the ability to extract or unwrap (fully or partially) the flying lead end of Launch Cable (2) while the launch cable remains connected to the OTDR, and second, to easily replace the Launch Cable (module) by disconnecting Launch Cable connector (8) from OTDR connector (9).

A third key feature of the present invention is that the OTDR (3) may be equipped with a wireless transmitter/receiver (10) so that the OTDR can receive setup information and commands from, and send status information, current settings, and test results to an external device (4) such as a smartphone, tablet, or PC.

The external device (4) can:
process the test results it receives from the OTDR (3) using suitable software and algorithms, and then locally display, store, or print these processed results, or retransmit these processed results to another device.
Commands received by OTDR (3) from the external device (4), can be used to change OTDR settings, request current OTDR setting values, or manage tests, in other words to start, pause, provide the status of, or stop a given test.

Thus, Device (1) of this invention provides the following benefits to users:
1) Ability to easily mount, place, or hang Device (1), a single instrument containing both an OTDR and launch cable, near the patch panel that provides access to the fiber optic link under test, while the user sets up Device (1) and reviews test results generated by Device (1) using their smart device, while sitting or standing at a convenient location, either locally (in the same room, for example) or remotely (in a different building, for example).
2) Ability to easily replace the Launch Cable module (2) contained by Device (1).
3) Ability to use software applications on and the networking capabilities of their smart device (A) to process results, prepare test reports, or send results or reports to remote users or servers via file transfer protocols, email, text messages, or other methods.
4) Ability to take advantage of processing and networking capabilities of the remote device (4) in order to use simpler, lower power processors and other electronics in Device (1) and thus reduce the cost, improve battery life, and improve the reliability of Device (1).

Figure 2:
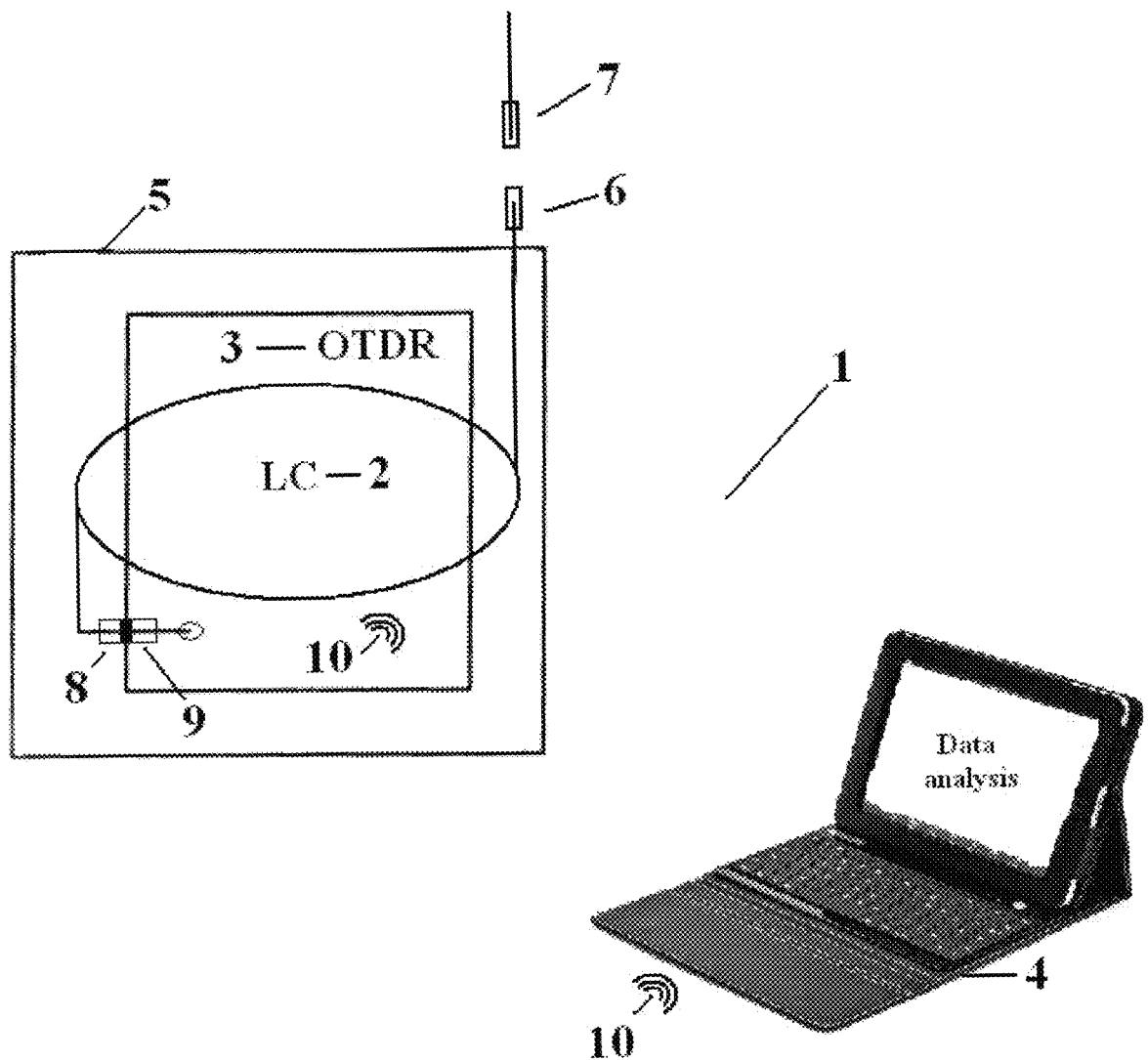
FIG. 2 shows the structural scheme of the special embodiment of the present invention in which the Launch Cable module coils around the OTDR module.
Figure 3:
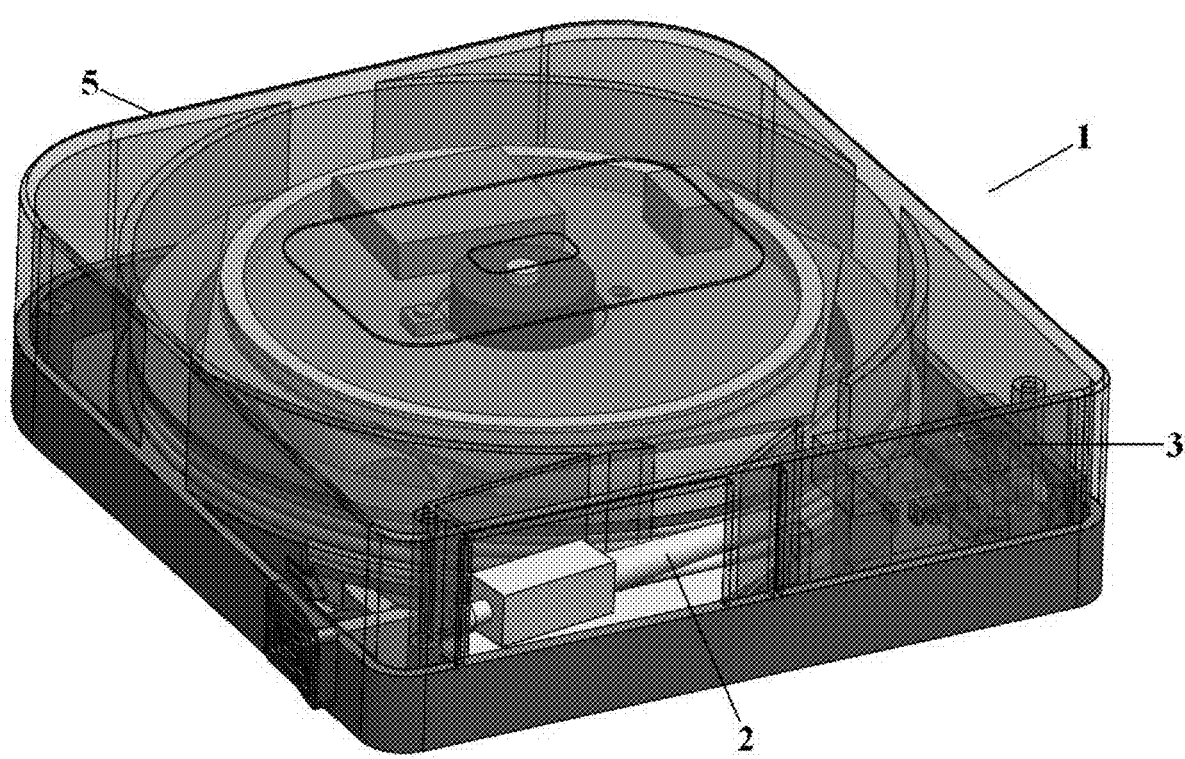
FIG. 3 shows one implementation of the present invention in which the OTDR is contained within a launch cable spool that is spring-loaded relative to the housing such that the spool and OTDR rotate, and the spring is stretched, when the flying lead is extracted, so that the flying lead can be fully or partially retracted using tension applied by the spring.
Figure 4:
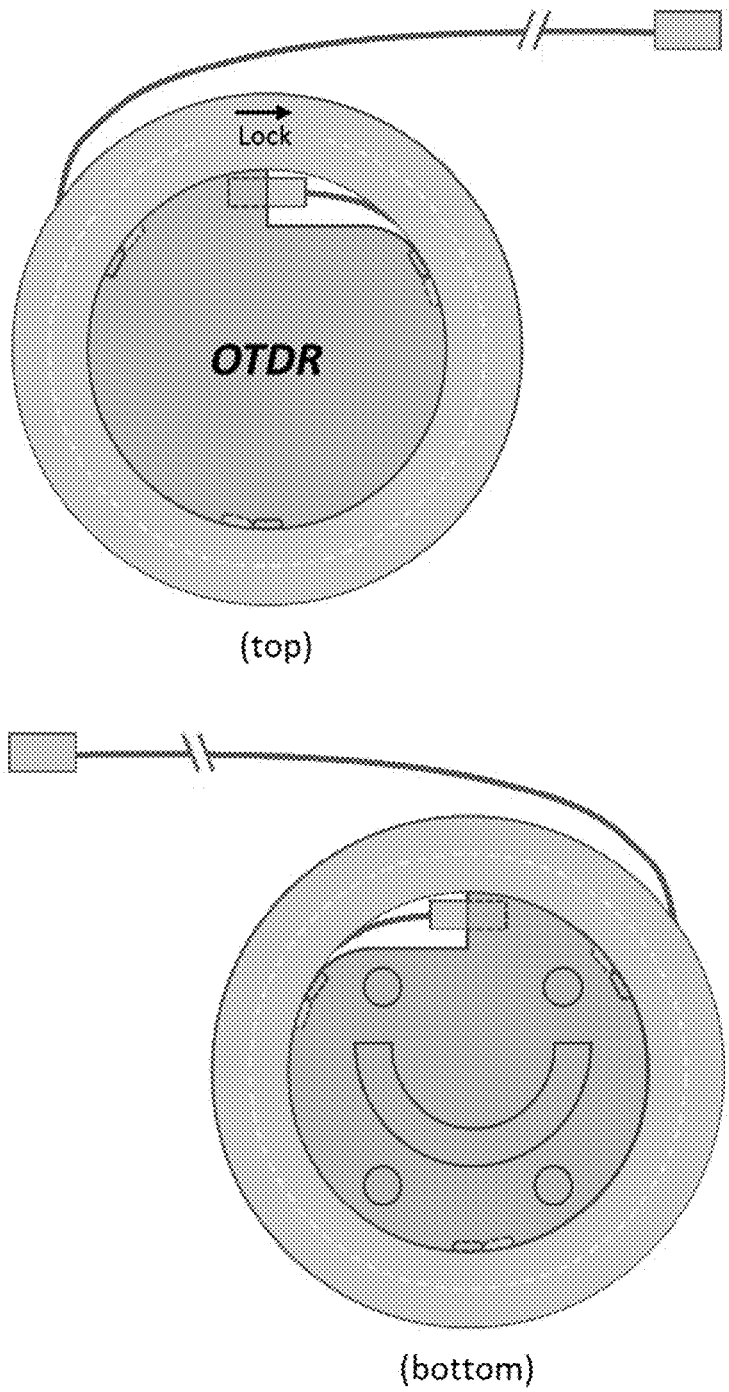
FIG. 4 shows a second implementation of the present invention in which the OTDR is contained within the launch cable spool and the flying lead is manually unwrapped and rewrapped.

The present invention also includes a special embodiment (please see FIG. 2) in which the OTDR (3) and Launch Cable (2) modules are arranged so that the Launch Cable (2) physically surrounds the OTDR (3). In this configuration the Device (1) becomes more compact (has less volume) and resistant to damage from drops or other external impacts.

Another possible embodiment of this invention combines stand-alone OTDR, that is an OTDR with an integrated user interface (UI), which may include an LCD display and touch panel, with the launch cable module in a single housing. This option is preferable in cases where an external wireless device cannot be used (hospitals, etc.).

In order to illustrate and describe the invention, a description of the most preferred embodiment options is provided hereinabove. This invention does not require particular steps to be performed or does not limit a claim to a particular structure or scope. The above description shall be regarded as an illustration rather than a limitation. It is apparent that specialists in the field may be well aware of multiple possible modifications and variations. The described methods of embodiment have been selected and described with the aim to assist the specialists in the field in exploring the principles of the invention and its practical application using various methods and modifications for particular use or embodiment, as quantitative parameters of the product and its application may be different depending on the particular use or embodiment. It has been anticipated that the scope of invention is defined by the enclosed claim and its equivalents containing the terms that are used in the widest scope of meaning, unless stated otherwise. It has been acknowledged that methods of embodiment described by the specialists in the field may provide amendments that do not deviate from the scope of the invention as stated in the claim hereinafter.

I claim:

1. A device designed to test an optical fiber, comprising:
a Launch Cable comprising a first end and a second end, wherein said first end comprises a connector designed for connection to the optical fiber under test;
an Optical Time-Domain Reflectometer (OTDR) connected to said second end of said Launch Cable through a standard fiber optic connector, wherein said OTDR sends and receives-optical signals through said Launch Cable; and
a single housing, wherein said Launch Cable and said OTDR are connected to one another and disposed within said housing such that said first end of said Launch Cable is extractable and retractable from said housing.

2. The device according to claim 1, wherein said OTDR comprises a wireless transmitter/receiver in wireless communication with an external device such that said OTDR is operable remotely via said external device and test results from said OTDR are viewable remotely on said external device.

3. The device according to claim 2, wherein said Launch Cable further comprises a launch cable spool with spring-loading relative to said housing such that extracting said first end of said Launch Cable from said housing adds tension to said spring-loading.

4. The device according to claim 2, wherein said first end of said Launch Cable is manually wrappable and unwrappable.

5. The device according to claim 2, wherein said OTDR comprises an integrated UI, wherein said UI comprises an LCD and touch panel.

6. The device according to claim 2, wherein said Launch Cable and said OTDR are disposed within said housing such that said Launch Cable physically surrounds said OTDR.

7. The device according to claim 6, wherein said Launch Cable further comprises a launch cable spool with spring-loading relative to said housing such that extracting said first end of said Launch Cable from said housing adds tension to said spring-loading.

8. The device according to claim 6, wherein said first end of said Launch Cable is manually wrappable and unwrappable.

9. The device according to claim 6, wherein said OTDR comprises an integrated UI, wherein said UI comprises an LCD and touch panel.

10. The device according to claim 1, wherein said Launch Cable and said OTDR are disposed within said housing such that said Launch Cable physically surrounds said OTDR.

11. The device according to claim 10, wherein said Launch Cable further comprises a launch cable spool with spring-loading relative to said housing such that extracting said first end of said Launch Cable from said housing adds tension to said spring-loading.

12. The device according to claim 10, wherein said first end of said Launch Cable is manually wrappable and unwrappable.

13. The device according to claim 10, wherein said OTDR comprises an integrated UI, wherein said UI comprises an LCD and touch panel.

14. The device according to claim 1, wherein said Launch Cable further comprises a launch cable spool with spring-loading relative to said housing such that extracting said first end of said Launch Cable from said housing adds tension to said spring-loading.

15. The device according to claim 14, wherein said first end of said Launch Cable is manually wrappable and unwrappable.

16. The device according to claim 14, wherein said OTDR comprises an integrated UI, wherein said UI comprises an LCD and touch panel.

17. The device according to claim 1, wherein said first end of said Launch Cable is manually wrappable and unwrappable.

18. The device according to claim 17, wherein said OTDR comprises an integrated UI, wherein said UI comprises an LCD and touch panel.

19. The device according to claim 1, wherein said OTDR comprises an integrated user interface (UI), wherein said UI comprises a liquid crystal display (LCD) and touch panel.

* * * * *